(12) United States Patent
Sardana et al.

(10) Patent No.: US 6,590,194 B2
(45) Date of Patent: Jul. 8, 2003

(54) MULTI-FIBER OPTIC 2D-ARRAY DEVICE FOR SENSING AND LOCALIZING ENVIRONMENT PERTURBATION USING SPECKLE IMAGE PROCESSING

(75) Inventors: Harish Kumar Sardana, Chandigarh (IN); Jagdish Kumar Chhabra, Chandigarh (IN); Somnath Bandyopadhyaya, Chandigarh (IN); Pramod Kumar Goel, Chandigarh (IN)

(73) Assignee: Council of Scientific & Industrial Research, New Delhi (IN)

( * ) Notice: Subject to any disclaimer, the term of this patent is extended or adjusted under 35 U.S.C. 154(b) by 133 days.

(21) Appl. No.: 09/818,724

(22) Filed: Mar. 27, 2001

(65) Prior Publication Data

US 2002/0139919 A1 Oct. 3, 2002

(51) Int. Cl.[7] .............................................. H01L 27/00
(52) U.S. Cl. ............................ 250/208.1; 250/227.14; 356/35.5
(58) Field of Search ...................... 250/208.1, 227.14, 250/227.16, 227.19; 356/35.5

(56) References Cited

U.S. PATENT DOCUMENTS 5,206,923 A * 4/1993 Karlsson ...................... 385/12
5,946,094 A * 8/1999 Sahlgren et al. ............ 356/477

* cited by examiner

*Primary Examiner*—Georgia Epps
*Assistant Examiner*—Richard Hanig
(74) *Attorney, Agent, or Firm*—Mathews, Collins, Shepherd & McKay, P.A.

(57) ABSTRACT

System for sensing perturbations in a distributed manner using an array of multimode fibers for localization (zone identification) of the perturbation, particularly, the present invention relates to a two dimensional array based speckle pattern sensing system having 4×3 (12) multimode fibers for sensing perturbation in multiple zones, said multimode fibers are imaged in parallel by a charge coupled device (CCD) camera and their speckle pattern analyzed by a conventional image processing hardware to determine the perturbations.

71 Claims, 4 Drawing Sheets

The image frame showing the 12 circular speckles from 12 multimode fibres

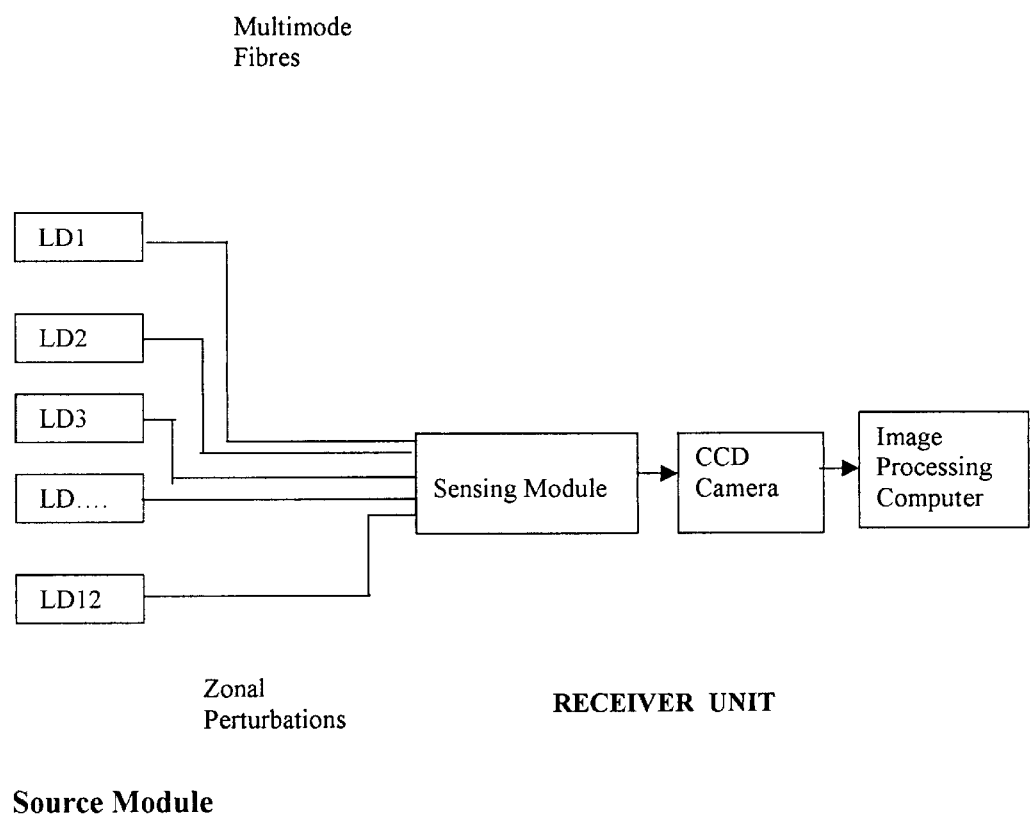
Figure 1: Experimental Setup for Multi-fibre multi-mode environment perturbation Sensor

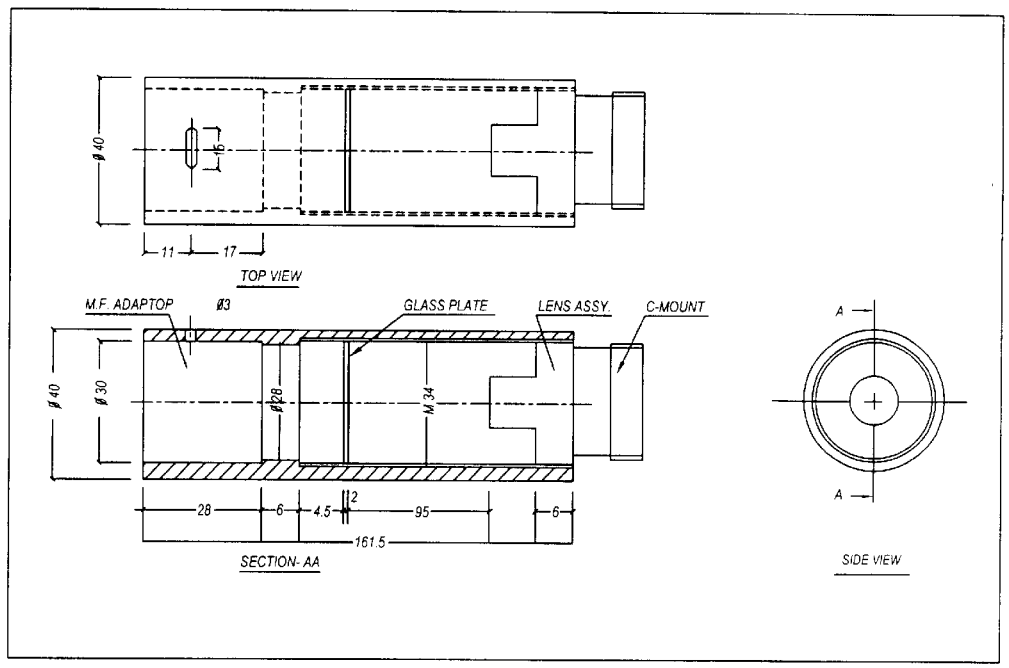
Figure 2: sensing Module showing different parts(MFA, Glass plate and Lens Assembly)

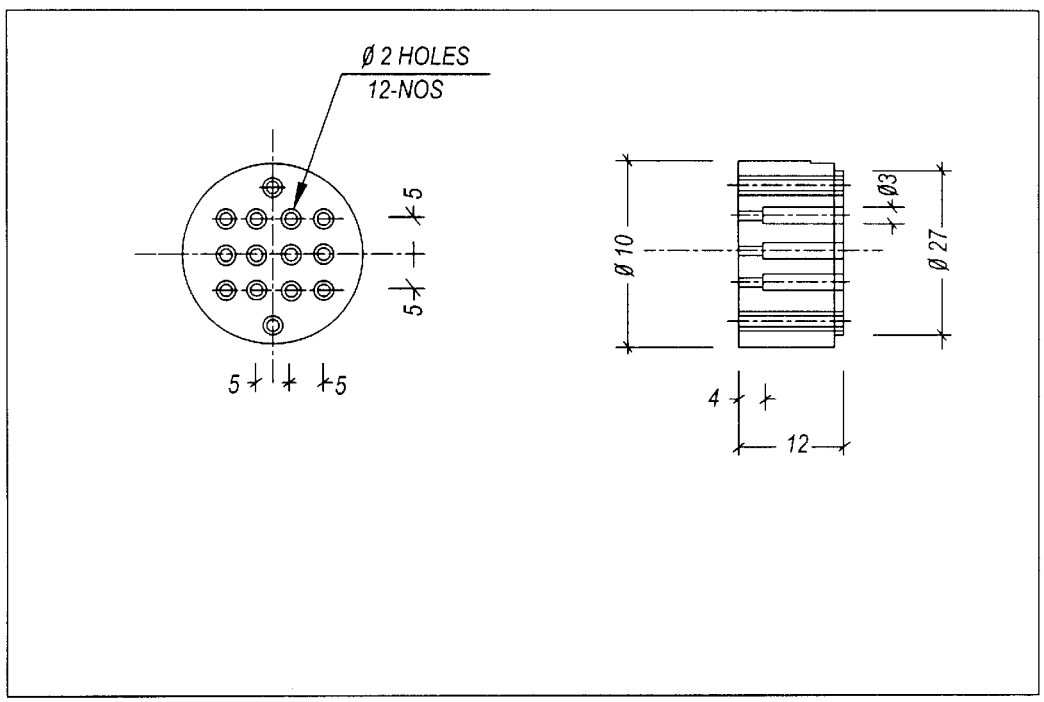
Figure 3: Design of Multi Fibre Adaptor

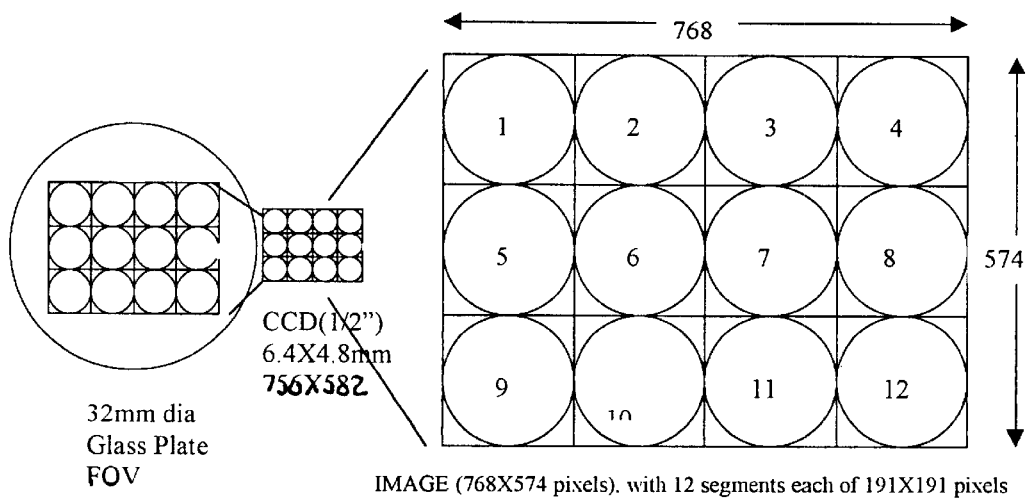
Figure 4: The image frame showing the 12 circular speckles from 12 multimode fibres

MULTI-FIBER OPTIC 2D-ARRAY DEVICE FOR SENSING AND LOCALIZING ENVIRONMENT PERTURBATION USING SPECKLE IMAGE PROCESSING

FIELD OF THE INVENTION

A system for sensing perturbations in a distributed manner using an array of multimode fibres for localization (zone identification) of the perturbation. Particularly, the present invention relates to a two dimensional array based speckle pattern sensing system having 4×3 (12) multimode fibres for sensing perturbation in multiple zones, said multimode fibres are imaged in parallel by a charge coupled device (CCD) camera and their speckle pattern analyzed by a conventional image processing hardware to determine the perturbations.

BACKGROUND AND PRIOR ART TO THE INVENTION

Various types of environment perturbation measurement have been attempted by researchers and that includes, but not limited to, displacement, vibration, pressure, stress, strain, temperature, intrusion, acoustic wave etc. The principle of speckle pattern and its use in sensing environment perturbation is well known. An analysis of the changes in the speckle pattern output from a multimode optical fibre could be used to obtain information about the perturbation of the fibre. In all the cases reported till now a single multimode fibre is used and a single speckle pattern analyzed for perturbation sensing. Although, the distribution sensing capability of the fibre can cover a large area of sensing, but the sensing zone remains only one. Therefore, the localization of the perturbation always remains a problem.

It is well known that the output speckle-intensity distribution from a multi-mode fibre is affected by the perturbation of the fibre, and it can be used for sensing. In other words, if the fibre status changes because of an external perturbation, the output speckle pattern also changes. Even though it is difficult to predict the speckle distribution, an approximate relationship between the perturbing factor and the speckle intensity distribution may be developed for which the perturbation of the fibre may be determined.

When the output from a multimode fibre is projected on a screen (e.g., a ground glass plate), a uniform circular pattern is observed. When the light is coherent, the pattern becomes very granular, consisting of a very large number of speckles of varying intensities with smooth distribution of intensity. The distribution of these speckle changes slowly over time, but the intensity of the total circular pattern remains basically constant. This pattern is very sensitive to perturbations (that include, but not limited to, displacement, vibration, pressure, stress, strain, temperature, intrusion, acoustic wave etc) on the fibre which generate the change in path of light in various modes. When the optical fibre carrying the coherent light is perturbed, the distribution of the speckle intensities is seen to change with the perturbation, with some speckles becoming brighter, some dimmer, and some not changing at all. The total intensity of the pattern remains unchanged, however. Hence it is not an intensity-modulated sensor as the total intensity is always a constant.

The system in its prior form is used as follows. The multimode fibre is kept in the environment to be sensed in a distributed manner, i.e. the changes in the perturbation any where on the length of the fibre can be sensed equally without discrimination. As mentioned earlier, the fibre may sense various types of environment perturbation. A CCD camera senses the speckle pattern generated at the end of the fibre core falling on a ground glass plate. The CCD camera has an array of photosensors (charge coupled) arranged in a two dimensional array form. Each photosensing element contributes one picture element, or pixel, to the image frame. The image falling on the CCD can be captured by image acquisition hardware residing in a computer. The amplitude of the perturbation is sensed by the image processing of the speckle pattern. The typical processing requirement of an image here are differentiating the current speckle image with respect to the previous or the reference speckle image stored earlier. In this manner the amplitude of the perturbation can be measured.

The above solution to perturbation sensing appears fine unless one realises that the present day standard cameras are capable of acquiring images of the order of 768×574 or more in the two dimensions. At the time when the experimental studies for such speckle image processing were being developed, it was found that the information describing an image can be unacceptably large for processing of speckle patterns in real time because of non availability of such real-time processing hardware. It was then shown by (Kulchin et. al., Optical Engg, V. 36, No. 5, 1997) that television standard images contain unnecessary information about the speckle pattern formed by ordinary multimode optical fibres. The average size of the speckles can be calculated as (Svelto, 1982):

$$\text{Average size of the speckles} = 2R(\lambda/D),$$

where D is the diameter of the source of light (optical fibre core), R is the distance between the source and plane of registration, and λ is the wavelength of the laser diode.

The diameter of a light field formed by an optical fibre in the plane, placed at a distance R from its output, can be calculated as (1983, Synder & Love):

$$\text{The diameter of light field} = 2.NA.R,$$

where NA is the numerical aperture of optical fibre. Thus, the entire number of light and dark speckles in the speckle pattern can be calculated by:

$$\text{Total number of light and dark patterns} = (NA^2.D^2)/\lambda^2$$

If formed by a standard multimode optical fibre with parameters NA=0.2 and D=50 μm, and using a Laser Diode (λ=0.6328 μm), the number of such speckles in a circular pattern is ≈252. The standard CCD cameras with 756×582 pixels can easily sense the perturbation affecting the speckle distribution. The latest pipelined or parallel image processing hardware allows image frame operations in real-time. This forms the basis of the development of the device, which has even wider sensing ability by way of an array of multimode fibres.

Spillman et. al. (Applied Optics, V. 28, No. 15, 1989) claim the use of Statistical Mode Sensor (SMS) include, but are not limited to, intrusion detection, structural vibration sensing, and acoustic sensing. In their sensor, all the image (using 128×128 array of photodiodes) processing occurs in electronics. Just before a new pixel is stored in the frame buffer, the old pixel data is removed, and both old and new pixel data are passed to an arithmetic circuit. The arithmetic circuit finds the absolute value of the differences between the old and new pixels. All the absolute values of the differences for the entire frame are then accumulated and normalised to give a single value. The single value represents the amount of change in the speckle pattern that occurs over a period of time between the captured frames.

OBJECTS OF THE INVENTION

The main object of the present invention is to provide a system capable of sensing perturbation in multiple zones at the same time.

Another object of the present invention is to provide a multi-fiber optic 2D-array system for sensing and localizing environmental perturbations.

Still another object of the present invention is to provide a multi-fiber optic 2D-array system for sensing perturbations using speckle image processing.

Yet another object of the present invention is to provide a system wherein the sensing module comprises of a Multi Fiber Adapter (MFA), a diffusing glass plate and a lens assembly which can stand alone as a unit and be used as a sensing system for sensing as well as localization of perturbation in a distributed manner.

SUMMARY OF THE INVENTION

BRIEF DESCRIPTION OF THE ACCOMPANYING DRAWINGS

In the drawings following the specification,

FIG. 1 shows the overall block diagram of the system.

FIG. 2 shows the top view, side view and the sectioned view of the Sensing Module and its different parts.

FIG. 3 shows the design of the Multi Fiber Adapter (MFA).

FIG. 4 shows the image frame depicting the 12 circular speckles from the 12 multimode fibres.

The invention relates to a system for sensing and localization (zone identification) of perturbations in a distributed manner using 2D-array of multimode fibres, said system comprising one or more light sources, a set of multimode optical fibres, a Multi Fiber Adapter (MFA), a diffusing glass plate, a lens assembly, a charge coupled device (CCD) camera, and an image processing hardware. More particularly, the novelty of the system lies in the use of a sensing module comprising of a multi fiber adapter (MFA), a diffusing glass plate and a lens assembly that, as a stand alone unit, is used to develop a sensing system for sensing as well as localization of perturbation in a distributed manner.

DETAILED DESCRIPTION OF THE INVENTION

Accordingly, the present invention provides a system for sensing and localization (zone identification) of perturbations in a distributed manner using 2D-array of multimode fibres, said system comprising a Source Module, one or more multimode fibres, and a Receiver unit comprising of a Sensing Module, a charge coupled device (CCD) camera, and an image processing unit.

In an embodiment of the present invention, the system can be used for sensing the perturbations selected from the parameters comprising of but not limited to displacement, vibration, pressure, stress, strain, temperature, intrusion and acoustic wave.

In another embodiment of the present invention, the Source Module comprises of 12 laser diodes with standard coupling optics and fiber pigtail.

In still another embodiment of the present invention, the laser diodes emit coherent monochromatic light having wavelength of 0.6328 $\mu$m.

In yet another embodiment of the present invention, 12 multimode fibres having a fixed diameters between 50 to 125 $\mu$m, and Numerical Aperture (NA)=0.2 are used.

In one more embodiment of the present invention, one or more multimode fiber is used for each zone.

In one another embodiment of the present invention, the multimode optical fibers are made to pass through the zones where perturbation sensing is desired.

In an embodiment of the present invention, the optical signals from the multimode fibres are guided to the Sensing Module using pigtails (pieces of fibres) having the same specification as that of the multimode fibres.

In another embodiment of the present invention, the Sensing Module comprises of a Multi Fiber Adapter (MFA), a ground glass plate, and a lens assembly.

In still another embodiment of the present invention, the MFA has provisions for accommodating 12 multimode fibers.

In yet another embodiment of the present invention, the fibres are mounted on to the MFA using ferrules of FC connectors.

In one more embodiment of the present invention, the fibres are arranged in the form of a 4×3 array in the MFA.

In one another embodiment of the present invention, the polished surfaces of the fibres are visible at the other end of the adapter.

In an embodiment of the present invention, the other end of the MFA is a vertical plane surface with holes provided for emission of light from the 12 multimode fibres coming from each zone.

In another embodiment of the present invention, the centers of the holes are 5 mm away.

In still another embodiment of the present invention, the glass plate is placed such that the speckle image generated at the output of each fiber is formed upon it.

In yet another embodiment of the present invention, the glass plate is placed at a distance where the size of the speckle pattern becomes 5 mm in diameter.

In one more embodiment of the present invention, the glass plate is placed at a distance of 12.5 mm from the end of the multimode fiber having Numerical Aperture (NA)=0.2.

In one another embodiment of the present invention, the glass plate is round shaped, having a diameter of 32 mm and a thickness of 2 mm.

In an embodiment of the present invention, the glass plate is made from a borosilicate crown glass, specifically the BK7 optical glass.

In still another embodiment of the present invention, the bubble and inclusion content of the glass plate is very low and the cross section is lesser than 0.029 mm$^2$/100 cm$^3$.

In yet another embodiment of the present invention, parallelism of the glass plate is of the order of 1' of an arc and having surface quality better than $\lambda$/2.

In one more embodiment of the present invention, the ground surface of the glass plate is developed with fine grade emery.

In one another embodiment of the present invention, the ground surface of the glass plate is placed towards the camera objective.

In an embodiment of the present invention, the glass plate will accommodate all the 12 speckle images formed.

In another embodiment of the present invention, the 12 speckle images formed on the glass plate have a diameter of 5 mm and will be just touching each other as they diverge linearly in the space i.e. the speckle pattern image when formed, does not overlap each other.

In one more embodiment of the present invention, the speckle image pattern covers a field of view (FOV) of 20×15 mm.

In one another embodiment of the present invention, the lens assembly has multi-element lenses.

In an embodiment of the present invention, the multi-element lens forms a single unified image of all the 12 speckle pattern images on the CCD array.

In another embodiment of the present invention, the multi-element lens has an optical reduction factor of 0.3.

In one another embodiment of the present invention, the multi-element lens has a working distance of 95 mm.

In still another embodiment of the present invention, the CCD camera senses perturbations from all the 12 zones simultaneously.

In yet another embodiment of the present invention, each speckle corresponds to a zone in the field.

In one more embodiment of the present invention, the CCD camera has a sensing area of 6.4 mm×4.8 mm, 756×582 sensing elements and each pixel size of 8.6×8.3 $\mu$m.

In an embodiment of the present invention, the CCD camera's resolution is 768×574 pixels (after image acquisition).

In still another embodiment of the present invention, the image processing unit digitalizes the output of the CCD camera.

In yet another embodiment of the present invention, the digitalization of approximately square pixels in the resolution of 768×574 pixels provides individual speckle patterns in 191×191 square covering circular speckle pattern for each zone.

In one more embodiment of the present invention, the spatial resolution on the object plane is 26 $\mu$m (in 768×574 resolution).

In one another embodiment of the present invention, the average diameter of the individual grains is ≈300 $\mu$m (with 5 mm per speckle pattern).

Further, the present invention presents a multi-fibre 2D array based system useful for sensing environment perturbation that includes, but are not limited to, displacement, vibration, pressure, stress, strain, temperature, intrusion, and acoustic wave, said system comprising a Source Module wherein the Source Module comprises of a set of Laser diodes (LD) for individually feeding the light to fibres spread over the fields of interest where zone based sensing is required, connected to a Receiving Unit comprising of a Sensing Module, a standard CCD camera to capture the speckle image; and an image processing unit for analyzing the environmental perturbation arising in different zones by one or more multimode optical fibres spread over a field in the form of zones where perturbation sensing is desired.

In an embodiment of the present invention, the Source Module consists of 12 laser diodes having a wavelength 0.6328 $\mu$m, and a conventional launching device for launching the light into optical fibres for each zone.

In another embodiment of the present invention, the multimode fibres have a diameter of 125 $\mu$m with core diameter of 50 $\mu$m, and NA=0.2, suitable for speckle pattern formation at the other (receiving) end.

In still another embodiment of the present invention, the Sensing Module comprises of a Multi Fibre Adapter (MFA) for accommodating fibres corresponding to various zones of interest; a diffusing glass plate placed at appropriate distance upon which speckle images are formed; and a lens assembly to image the speckle pattern formed on the glass plate on to the CCD plane.

In yet another embodiment of the present invention, the Multi Fibre Adapter (MFA) has provisions to place 12 multimode optical fibres in the form of 4×3 array, with their polished surfaces visible at the other end of the adapter.

In one more embodiment of: the present invention, the circular ground glass plate is placed at an appropriate distance from the illuminating surface of the fiber, said glass plate is made up of a borosilicate crown glass, more particularly of BK7 glass having very low bubble and inclusion content and cross section <0.029 mm$^2$/100 cm$^3$, which is relatively a hard glass and does not get scratched easily.

In one another embodiment of the present invention, the lens assembly has a reduction factor of 0.3 to image the 12 speckle patterns formed upon the glass plate on the CCD camera.

In an embodiment of the present invention, the standard C-mount CCD camera is having a ½" CCD format for capturing the image comprising of 12 speckle patterns.

In another embodiment of the present invention, the image processing unit extracts the amplitude of the perturbation as well as performs zone identification.

In still another embodiment of the present invention, the Source Module consists of 12 laser diodes with standard coupling optics and fiber pigtail for launching monochromatic light into the 12 multimode fibres.

In yet another embodiment of the present invention, the fibre emanate from the Source Module onwards in the field into different zones and the other end of the fibre reaches the Receiving Unit using standard SMA connector.

In one more embodiment of the present invention, the optical signals are guided to the Sensing Module using 12 pieces of fibres (12 tails) having the same specification as that of the multimode fibres, the fibers are mounted on the Multi-Fibre Adapter (MFA) using ferrules of FC connectors, and the MFA has the other end as vertical plane surface with holes providing for emission of light from all the 12 multimode fibres coming from the perturbing zone.

In one another embodiment of the present invention, the speckle pattern formation occurs in a conical space with each fibre as center, the ground glass plate at an appropriate distance is able to accommodate all the speckles just touching each other as they diverge linearly in the space, the image falling on the glass plate is capable of being sensed by a ½" CCD camera with an appropriate lens placed at an appropriate distance and the video output of the CCD camera can be directly interfaced with an image processing unit for further analysis.

In an embodiment of the present invention, the multimode fibres are placed at a central spacing of 5 mm to use standard connectors as well as forming a unified image consisting of 12 speckle patterns closely touching each other at an appropriate distance after diverging in space, the designed spacing is kept as 5 mm so that no two speckle patterns overlap at a later distance where ground glass plate is kept, the diameter of the light field formed by an optical fibre in a plane, placed at a distance R is given by 2.NA.R where NA is the numerical aperture of the fibre.

In another embodiment of the present invention, the glass plate is placed at a distance calculated in a manner that each speckle pattern size becomes 5 mm diameter again by the above formula, this distance comes out to be 12.5 mm for a multimode fibre having NA=0.2.

In still another embodiment of the present invention, the ground glass plate is made of BK7 glass, having 32 mm diameter and 2 mm thickness, the parallelism of the glass plate is of the order of 1' of an arc with surface quality better than $\lambda/2$, the ground surface is developed with a fine grade emery and it is placed towards the camera objective.

In yet another embodiment of the present invention, the CCD camera has a multi-element camera objective lens, designed for keeping the field of view of 20×15 mm on a ½" CCD with a working distance of 95 mm from the glass plate, and with an optical reduction of 0.3 for a ½" CCD size camera.

In one more embodiment of the present invention, the CCD camera resolution required is fairly standard with 768×574 pixels (after image acquisition) because the average size of the speckles can be calculated as $2R(\lambda/D)$, where D is the diameter of the source of light (optical fibre core), and R is the distance between the source and plane of registration, the diameter of a light field is 2.NA.R, the entire number of light and dark speckles in a single pattern can be calculated as $NA^2.D^2/\lambda^2$, if formed by a standard multimode fibre with optical parameters NA=0.2, and D=50 $\mu$m, and using a Laser diode ($\lambda$=0.6328 $\mu$m), and the number of such speckles in a single circular pattern is approximately equal to 252.

In one another embodiment of the present invention, the spatial resolution available in the system comes out to be 26 $\mu$m (with a FOV of 20×15 mm in 768×574 resolution) while the average diameter of the individual grains comes out to be 300 $\mu$m (with 5 mm dia for each circular speckle pattern), which can be easily resolved with a standard CCD camera.

In an embodiment of the present invention, the image digitized at 768×574 resolution provides 12 segments of size 191×191 pixels for each speckle pattern in a square, each segment in the image is corresponding to a zone, and identification in addition to measurement of perturbation amplitude and processing of the speckle pattern for quantification of the perturbation depends upon the user application and requirement.

In another embodiment of the present invention, the standard CCD camera with the above resolution easily senses the perturbation from 12 zones simultaneously where each speckle corresponds to a zone in the field.

In still another embodiment of the present invention, three such devices can be used together with image processing systems which allow three simultaneous camera video signals digitalized, thereby increasing the number of zones by three times.

In yet another embodiment of the present invention, the sensing elements: the multimode fibres are arranged as minimum 4×3 form allowing 12 zones using a standard CCD camera for image acquisition.

In one more embodiment of the present invention, the resolution is decided by the fibre zone length and layout.

In one another embodiment of the present invention, the system allows standard CCD camera for image acquisition and allows parallel and concurrent sensing of environment from at least 12 different zones.

In an embodiment of the present invention, the system allows sensing of many different environment perturbation parameters at a time, very suitable for monitoring and controlling of various perturbation factors multiplexed using a single device.

In another embodiment of the present invention, the total field of view is 20×14 mm for 4×3 multimode fibres and the resolution for each of 12 circular speckle pattern is 191×191 pixels.

In still another embodiment of the present invention, the number of array elements given here are 4×3=12, which can be increased by further reducing the spacing to the physical limits of the standard connectors and appropriately changing the spacing of glass plate.

In yet another embodiment of the present invention, more than one sensing modules can be used together for further increase of number of zones, this is possible by using typically acquiring three simultaneous video channels for three such sensing modules.

Having given the principle of the speckle pattern sensing the environment perturbation, we now provide the schematic design of the system which allows multifibres to be used to add two dimensions to the distributed sensing capability of a multimode fibre. A single multimode fibre can provide a circular speckle pattern on the whole CCD image but as mentioned earlier, the whole image is not needed for accommodating a single speckle pattern. Therefore, the design given here uses a 2D-array of multimode fibres (4×3=12) whose speckle images are made to fall on a ground glass plate. A CCD camera images the required field of view of all the speckle patterns digitised to a single 768×574 pixels image. In this manner, 12 speckle patterns are formed on the CCD array sensing different multimode fibres sensing perturbation in parallel from 12 different zones. The zoning here adds another dimension in sensing perturbation (in parallel) which has independent distributed sensing capability. Each zone sensing the environmental perturbation is visible on the computer speckle image with a resolution of 191×191) pixels. This resolution, by all means in various configurations is sufficient to sense perturbation leading to changes in 12 (4×3) speckle patterns. This scheme can be easily enhanced by reducing the fibres spacing.

The Source Module consists of 12 Laser Diodes (LDs) feeding 12 multimode fibres to be used as field (zone) sensors. The fibres are laid in the field in a manner as desired for the required perturbation to be sensed in different zones. The receiving ends of all the fibres terminate at the Receiver Unit using standard SMA connectors. The Receiver Unit guides the light from each of the zone fibres to a Sensing Module which consists of a Multi Fibre Adapter (MFA). This adapter has 12 holes (4×3) with hole-spacing (5 mm) to accept standard ferrules of FC connectors and the light from all these is available in parallel from the other surface of the adapter. The Sensing Module also houses a ground glass plate of 2 mm thickness at an appropriate distance (12.5 mm) where the ground surface of the plate has the speckle patterns from all the 12 multimode fibres ready for imaging. At this distance, all the patterns are of equal diameter (5 mm) and are just touching each other forming a field of view of 20×15 mm.

The speckle image falling on the circular glass plate is made to cover an image of 20×15 mm where 12 (4×3) speckle patterns touch each other and have a diameter of 5 mm each. A Lens Assembly with multi-element lenses is able to image all of them as a single unified image on to the CCD array of a standard CCD camera. The camera lens assembly requires an optical reduction factor of 0.3 with a working distance of 95 mm to suit a ½" CCD array. The CCD image when viewed on a monitor is viewed full in analog form. The output of this camera is digitized using an image processing hardware/software residing in a computer for further processing and analysis. The digitization used with approximately square pixels in the resolution of 768× 574 pixels provides individual speckle patterns in 191×191 square covering a circular speckle pattern for each zone. The image digitized with 768×574 resolution in the computer has all the required zones images (in 12 segments in the image) for individual or combined image processing.

The camera in the system uses a microscopic lens to image the speckle patterns falling on the ground glass area covering barely the speckle array of multiple multi-mode fibres. The total Field of View FOV of the speckle image area on the ground glass plate is 20×15 mm. With this setup, the spatial resolution on the object plane comes out to be 26 $\mu$m (in 768×574 resolution) while the average diameter of the individual grains comes out to be ≈300 $\mu$m (with 5 mm per speckle pattern) which can easily be resolved in this case.

As mentioned above, the camera used consists of a ½" CCD array which has a sensing area of 6.4 mm×4.8 mm, 756×582 sensing elements and each pixel size of 8.6×8.3 □m. With a microscopic lens leading to an optical reduction of 0.3, 12 speckle patterns are viewed on a computer or TV monitor. Further, with the image acquisition hardware/software, the image is digitized to an appropriate size, say 768×574 providing 191×191 pixels for each speckle pattern for further processing. With each speckle pattern corresponding to each multimode fibre, it is thus possible to identify each speckle, which is perturbed, and thus localize each perturbation by analyzing all the patterns in parallel or in sequence as per the requirement. The resolution of this localization, however, is limited to the extent identifying which fibre has been perturbed.

The special characteristics of the sensor and where it can be used are as follows:

a) A system useful for sensing environment purturbation (that includes but not limited to displacement, vibration, pressure, stress, strain, temperature, intrusion, acoustic wave etc.) in a distributed manner and also sensing in multiple zones easily identifiable using speckle image processing.

b) A system claimed herein wherein the sensing elements are multimode fibres arranged as minimum 4×3 form allowing 12 zones using a standard CCD camera for image acquisition.

c) A system useful for sensing perturbation in a distributed manner using an array of multimode fibres for localization (zone identification) of the perturbation with the resolution decided by the fibre zone length and layout.

d) A system allowing standard CCD camera for image acquisition and allows parallel and concurrent sensing of environment from at least 12 different zones.

e) A system that allows sensing of many different environment perturbation parameters at a time, very suitable for monitoring and controlling of various perturbation factors multiplexed using a single device.

f) A system with total field of view of 20×14 mm for 4×3 multimode fibres.

g) A system with 191×191 pixels of resolution for each of 12 circular speckle pattern.

h) The number of array elements given here are 4×3=12. This can be increased by further reducing the spacing to the physical limits of the standard connectors and appropriately changing the spacing of glass plate.

i) More than one sensing modules can be used together for further increase of number of zones. This is possible by using typically acquiring three simultaneous video channels for three such sensing modules.

The invention is described in detail in the examples given below which are provided by way of illustration and therefore should not be considered to limit the present invention in any manner.

EXAMPLE 1

For experimental testing, a 2D-array of 12 multi-mode fibre array was used and plugged in the MFA. The specifications of the fibres used were: NA=0.2, 50/125$\mu$, tight buffered, 0.9 mm. A Laser Diode ($\lambda$=0.6328 $\mu$m) has been used to illuminate all the twelve fibres. The image formed was projected on a ground glass. A 2D-array of 4×3 multi-mode fibre sensor with the above specifications, a camera, computer setup along with an image processing system has been used, as shown in FIG. 1. The vibration or dynamic status is sensed, using the mean absolute speckle intensity variation method, in which the speckle pattern in the initial state is subtracted from that in the current state. This sensing technique detects the mean-absolute speckle-intensity variation between the updated and the reference speckle pattern thereby determining the environmental perturbation factor. The overall intensity of the subtracted pattern is then integrated, so that it may be used to deduce the external perturbation. Kun Pan et al. (Applied Optics, V. 33, No. 10, 1994) has already reported determining sub-micrometer displacement as well as temperature measurement using this approach.

In the present application, a real-time image processing equipment, which has the processing power to produce the sum of absolute differences of the two frames is used. Here the two frames are the current frame and the one prior to the current one. The results showed the perturbation made in different fibres in the form of pressure applied on the individual multimode fibre sensor. In no pressure condition, the difference image showed nearly black patterns for all the cases. In case of fibre sensor under pressure, the integrated value for each speckle showed a high non-zero value indicating perturbation. The localization of the perturbed fibre is possible due to the array structure of the sensor.

EXAMPLE 2

The proposed system can also be used in security systems for intrusion detection. While the detection of an intruder is the basic requirement of such a system, the localization of the intruder or the approximate identification of the zone is equally important.

EXAMPLE 3

By further using more than one such sensing modules (typically 3) with one video channel each, further localization (i.e. more zoning) can be achieved due to simultaneous acquisition of these channels is possible in many image-processing systems.

ADVANTAGES OF THE INVENTION

More than one sensing modules can be used together for further increase of number of zones.

By using three simultaneous video channels, three sensing modules can be operated at the same time, thereby increasing the number of zones to 36.

The number of array elements given here are 4×3=12 m, which can be further increased by reducing the spacing to the physical limits of the standard connectors and appropriately changing the spacing of the glass.

The device gives 191×191 pixel resolution for each of the 12 circular speckle pattern which is sufficient for determining the perturbing force.

The device allows sensing of many different environmental perturbation parameters at a time.

The device is suitable for monitoring and controlling of various perturbing factors multiplexed using a device.

The device allows standard CCD camera for image acquisition and also allows parallel and concurrent sensing of environment from at least 12 zones.

What is claimed is:

1. A system for sensing and localization (zone identification) of perturbations in a distributed manner using 2D-array of multimode fibres characterized in using a 2D multi-fiber adapter (MFA) in the sensing module where in the said system comprising a Source Module (source for optical energy), one or more multimode fibres passing through zones where perturbation sensing is desired, and a Receiving Module comprising of a Sensing Module, a charge coupled device (CCD) camera, and an image processing unit.

2. A system as claimed in claim 1, wherein the system can be used for sensing the perturbations selected from the parameters comprising of displacement, vibration, pressure, stress, strain, temperature, intrusion and acoustic wave.

3. A system as claimed in claim 1, wherein the Source Module comprises of 12 laser diodes with standard coupling optics and fiber pigtail.

4. A system as claimed in claim 3, wherein the laser diodes emit coherent monochromatic light having wavelength of 0.6328 $\mu$m.

5. A system as claimed in claim 1, wherein 12 multimode fibres having a fixed diameters between 50 to 125 $\mu$m, and Numerical Aperture (NA)=0.2 are used.

6. A system as claimed in claim 1, wherein one or more multimode fiber is used for each zone.

7. A system as claimed in claim 1, wherein the multimode optical fibers are made to pass through the zones where perturbation sensing is desired.

8. A system as claimed in claim 1, wherein the optical signals from the multimode fibres are guided to the Sensing Module using pigtails (pieces of fibres) having the same specification as that of the multimode fibres.

9. A system as claimed in claim 1, wherein the Sensing Module comprises of a Multi Fiber Adapter (MFA), a ground glass plate, and a lens assembly.

10. A system as claimed in claim 9, wherein the MFA has provisions for accommodating 12 multimode fibers.

11. A system as claimed in claim 9, wherein the fibres are mounted on to the MFA using ferrules of FC connectors.

12. A system as claimed in claim 9, wherein the fibres are arranged in the form of a 4×3 array in the MFA.

13. A system as claimed in claim 9, wherein polished surfaces of the fibres are visible at the other end of the adapter.

14. A system as claimed in claim 9, wherein the other end of the MFA is a vertical plane surface with holes provided for emission of light from the 12 multimode fibres coming from each zone.

15. A system as claimed in claim 14, wherein the centers of the holes are 5 mm away.

16. A system as claimed in claim 9, wherein the glass plate is placed such that a speckle image generated at the output of each fiber is formed upon it.

17. A system as claimed in claim 9, wherein the glass plate is placed at a distance where the size of a speckle pattern becomes 5 mm in diameter.

18. A system as claimed in claim 9, wherein the glass plate is placed at a distance of 12.5 mm from the end of the multimode fiber having Numerical Aperture (NA)=0.2.

19. A system as claimed in claim 9, wherein the glass plate is round shaped, having a diameter of 32 mm and a thickness of 2 mm.

20. A system as claimed in claim 9, wherein the glass plate is made from a borosilicate crown glass precisely the BK7 optical glass.

21. A system as claimed in claim 9, wherein the bubble and inclusion content of the glass plate is very low and the cross section is lesser than 0.029 mm$^2$/100 cm$^3$.

22. A system as claimed in claim 9, wherein parallelism of the glass plate is of the order of 1' of an arc and having with surface quality better than $\lambda/2$.

23. A system as claimed in claim 9, wherein the ground surface of the glass plate is developed with fine grade emery.

24. A system as claimed in claim 9, wherein the ground surface of the glass plate is placed towards the camera objective.

25. A system as claimed in claim 9, wherein the glass plate will accommodate all 12 speckle images formed.

26. A system as claimed in claim 25, wherein the 12 speckle images formed on the glass plate have a diameter of 5 mm and will be just touching each other as they diverge linearly in the space.

27. A system as claimed in claim 26, wherein the speckle pattern formation occurs in conical shape with each fiber as center.

28. A system as claimed in claim 26, wherein the speckle pattern image when formed, does not overlap each other.

29. A system as claimed in claim 26, wherein the speckle image pattern covers a field of view (FOV) of 20×15 mm.

30. A system as claimed in claim 9, wherein the lens assembly has multi-element lenses.

31. A system as claimed in claim 9, wherein the multi-element lens forms a single unified image of all the 12 speckle pattern images on the CCD array.

32. A system as claimed in claim 9, wherein the multi-element lens has all optical reduction factor of 0.3.

33. A system as claimed in claim 1, wherein the CCD camera senses perturbations from 12 zones simultaneously.

34. A system as claimed in claim 16, wherein each speckle corresponds to a zone in the field.

35. A system as claimed in claim 1, wherein the CCD camera has a sensing area of 6.4 mm×4.8 mm, 756×582 sensing elements and each pixel size of 8.6×8.3 $\mu$m.

36. A system as claimed in claim 1, wherein the CCD camera is placed 95 mm from the glass.

37. A system as claimed in claim 1, wherein the CCD camera's resolution is 768×574 pixels (after image acquisition).

38. A system as claimed in claim 1, wherein the CCD image when viewed on a monitor is viewed full in analog form.

39. A system as claimed in claim 1, wherein the image processing unit digitalizes the output of the CCD camera.

40. A system as claimed in claim 1, wherein the digitalization of approximately square pixels in the resolution of 768×574 pixels provides individual speckle patterns in 191× 191 square covering circular speckle pattern for each zone.

41. A system as claimed in claim 1, wherein the spatial resolution on the object plane is 26 $\mu$m (in 768×574 resolution).

42. A system as claimed in claim 1, wherein the average diameter of individual grains is ≈300 $\mu$m (with 5 mm per speckle pattern).

43. A multi-fibre 2D array based system useful for sensing environment perturbation that includes, but not limited to, displacement, vibration, pressure, stress, strain, temperature, intrusion, and acoustic wave, said system comprising a Source Module wherein the Source Module comprises of a set of Laser diodes (LD) for individually feeding the light to fibres spread over the fields of interest where zone based sensing is required, connected to a Receiving Unit comprising of a Sensing Module, a standard CCD camera to grab a speckle image; and an image processing unit for analyzing the environment perturbation arising in different zones by one or more multimode optical fibres spread over a field in the form of zones where perturbation sensing is desired.

44. A system as claimed in claim 43, wherein the Source Module consists of 12 laser diodes having a wavelength 0.6328 $\mu$m, and a conventional launching device for launching the light into optical fibres for each zone.

45. A system as claimed in claim 44, wherein the multimode fibres have a diameter ranging between 50 to 125 $\mu$m, and NA=0.2, suitable for speckle pattern formation at the other (receiving) end.

46. A system as claimed in claim 44, wherein the Sensing Module comprises of a Multi Fibre Adapter (MFA) for accommodating fibres corresponding to various zones of interest;

a diffusing glass plate placed at appropriate distance upon which the speckle images are formed; and a lens assembly to image speckle pattern formed upon the glass plate on to the CCD plane.

47. A system as claimed in claim 46, wherein the Multi Fibre Adapter (MFA) has provisions to place 12 multimode optical fibres in the form of 4×3 array, with their polished surfaces visible at the other end of the adapter.

48. A system as claimed in claim 47, wherein the circular ground glass plate is placed at an appropriate distance from the illuminating surface of the fiber, said glass plate is made up of a borosilicate crown glass, more particularly of BK7 glass having very low bubble and inclusion content and cross section <0.029 mm$^2$/100 cm$^3$, which is relatively a hard glass and does not get scratched easily.

49. A system as claimed in claim 47, wherein the lens assembly has a reduction factor of 0.3 to image the 12 speckle patterns formed upon the glass plate on to the CCD camera.

50. A system as claimed in claim 47, wherein the standard C-mount CCD camera is a ½" CCD camera for capturing the image comprising of 12 speckle patterns.

51. A system as claimed in claim 44, wherein the image processing unit extracts the amplitude of the perturbation as well as performs zone identification.

52. A system as claimed in claim 44, wherein the Source Module consists of 12 laser diodes with standard coupling optics and fiber pigtail for launching monochromatic light into the 12 multimode fibres.

53. A system as claimed in claim 44, wherein the fibre emanate from the Source Module onwards in the field into the perturbing zone and the other end of the fibre reaches the Receiving Unit using standard SMA connector.

54. A system as claimed in claim 44, wherein the optical signals are guided to the Sensing Module using 12 pieces of fibres (12 tails) having the same specification as that of the multimode fibres, the fibers are mounted on the Multi-Fibre Adapter (MFA) using ferrules of FC connectors, and the MFA has the other end as vertical plane surface with holes provided for emission of light from all the 12 multimode fibres coming from the perturbing zone.

55. A system as claimed in claim 44, wherein the speckle pattern formation occurs in a conical space with each fibre as center, the ground glass plate at an appropriate distance is able to accommodate all the speckles just touching each other as they diverge linearly in the space, the image falling on the glass plate is capable of being sensed by a ½" CCD camera with an appropriate lens placed at an appropriate distance and the video output of the CCD camera can be directly interfaced with an image processing unit residing in the computer for further analysis.

56. A system as claimed in claim 44, wherein the multimode fibres are placed at a central spacing of 5 mm to use standard connectors as well as forming a unified image consisting of 12 speckle patterns closely touching each other at an appropriate distance after diverging in space, the designed spacing is kept as 5 mm so that no two speckle patterns overlap at a later distance where ground glass plate is kept, and the diameter of the light field formed by an optical fibre in a plane placed at a distance R is given by 2.NA.R where NA is the numerical aperture of the fibre.

57. A system as claimed in claim 44, wherein the glass plate is placed at a distance calculated in a manner that each speckle pattern size becomes 5 mm diameter again by the above formula, this distance comes out to be 12.5 mm for a multimode fibre of NA=0.2.

58. A system as claimed in claim 47, wherein the ground glass plate is made of BK7 glass, having 32 mm diameter and 2 mm thickness, the parallelism of the glass plate is of the order of 1' of an arc with surface quality better than $\lambda/2$, the ground surface is developed with a fine grade emery and it is placed towards the camera objective.

59. A system as claimed in claim 44, wherein the CCD camera has a multi-element camera objective lens, designed for keeping the field of view of 20×15 mm on a ½" CCD with a working distance of 95 mm from the glass plate, and with an optical reduction of 0.3 for a ½" CCD size camera.

60. A system as claimed in claim 44, wherein the CCD camera resolution required is fairly standard with 768×574 pixels (after image acquisition) because the average size of the speckles can be calculated as $2R(\lambda/D)$, where D is the diameter of the source of light (optical fibre core), and R is the distance between the source and plane of registration, the diameter of a light field is 2.NA.R, the entire number of light and dark speckles in a single pattern can be calculated as $NA^2.D^2/\lambda^2$, if formed by a standard multimode fibre with optical parameters NA=0.2, and D=50 $\mu$m, and using a Laser diode ($\lambda$=0.6328 $\mu$m), and the number of such speckles in a single circular pattern is approx. 252.

61. A system as claimed in claim 44, wherein the spatial resolution available in the system comes out to be 26 $\mu$m (with a FOV of 20×15 mm in 768×574 resolution) while the average diameter of the individual grains comes out to be 300 $\mu$m (with 5 mm dia for each circular speckle pattern), which can be easily resolved with a standard CCD camera.

62. A system as claimed in claim 44, wherein the image digitized at 768×574 resolution provides 12 segments of size 191×191 pixels for each speckle pattern in a square, each segment in the image is corresponding to a zone, and identification in addition to measurement of perturbation amplitude and processing of the speckle pattern for quantification of the perturbation depends upon user application and requirement.

63. A system as claimed in claim 44, where the standard CCD camera with the above resolution easily senses the perturbation from 12 zones simultaneously where each speckle corresponds to a zone in the field.

64. A system as claimed in claim 44, wherein three such devices can be used together with image processing systems which allow three simultaneous camera video signals to be digitalized, thereby increasing the number of zones by three times.

65. A system as claimed in claim 44, wherein the sensing elements: the multimode fibres are arranged as minimum 4×3 form allowing 12 zones using a standard CCD camera for image acquisition.

66. A system as claimed in claim 44, wherein the resolution is decided by the fibre zone length and layout.

67. A system as claimed in claim 44, where in the system allows standard CCD camera for image acquisition and allows parallel and concurrent sensing of environment from at least 12 different zones.

68. A system as claimed in claim 44, wherein the system allows sensing of many different environment perturbation parameters at a time, very suitable for monitoring and controlling of various perturbation factors multiplexed using a single device.

69. A system as claimed in claim 44, wherein the total field of view is 20×14 mm for 4×3 multimode fibres and the resolution for each of 12 circular speckle pattern is 191×191 pixels.

70. A system as claimed in claim 44, wherein the number of array elements given here are 4×3=12, which can be increased by further reducing the spacing to the physical limits of the standard connectors and appropriately changing the spacing of glass plate.

71. A system as claimed in claim 44, wherein the more than one sensing modules can be used together for further increase of number of zones, this is possible by using typically acquiring three simultaneous video channels for three such sensing modules.

* * * * *